(12) United States Patent
Bakken et al.

(10) Patent No.: US 8,657,183 B2
(45) Date of Patent: Feb. 25, 2014

(54) METHOD OF BONDING POLY-CRYSTALLINE DIAMONDS TO WEAR SURFACES

(76) Inventors: Gary J. Bakken, Edmonton (CA); Mike Zulak, Spruce Grove (CA)

( * ) Notice: Subject to any disclaimer, the term of this patent is extended or adjusted under 35 U.S.C. 154(b) by 382 days.

(21) Appl. No.: 12/984,092

(22) Filed: Jan. 4, 2011

(65) Prior Publication Data

US 2011/0271604 A1    Nov. 10, 2011

(30) Foreign Application Priority Data

May 10, 2010 (CA) .................................... 2703082

(51) Int. Cl.
*E21B 10/46* (2006.01)
*B24D 18/00* (2006.01)
*B23K 31/00* (2006.01)

(52) U.S. Cl.
USPC ............... 228/122.1; 175/405.1; 175/420.2; 175/428; 175/434; 156/60; 156/242; 156/245; 51/293; 51/295

(58) Field of Classification Search
USPC .................... 228/121, 122.1; 51/293, 295; 175/405.1, 420.2, 428, 434; 156/60, 156/242, 245
See application file for complete search history.

(56) References Cited

U.S. PATENT DOCUMENTS

| 3,187,739 | A | 6/1965 | Fresne |
| 3,666,185 | A | 5/1972 | Williams |
| 4,721,256 | A | 1/1988 | Lyman |
| 4,962,893 | A | 10/1990 | Bochmann et al. |
| 5,049,164 | A * | 9/1991 | Horton et al. .................... 51/295 |
| 5,385,307 | A | 1/1995 | Azar |
| 6,374,932 | B1 * | 4/2002 | Brady ........................... 175/428 |
| 6,596,569 | B1 | 7/2003 | Bao et al. |
| 6,824,086 | B1 | 11/2004 | Mazurkiewicz et al. |
| 7,234,550 | B2 * | 6/2007 | Azar et al. ...................... 175/432 |
| 7,297,418 | B2 | 11/2007 | Watson |
| 7,416,141 | B2 | 8/2008 | Dobbs |
| 8,079,428 | B2 * | 12/2011 | Lyons et al. ................... 175/374 |
| 2004/0110395 | A1 | 6/2004 | Ueda et al. |
| 2006/0217258 | A1 | 9/2006 | Zhao |
| 2008/0029625 | A1 | 2/2008 | Talton |
| 2009/0170414 | A1 * | 7/2009 | Ferrell et al. .................. 451/540 |
| 2011/0114394 | A1 * | 5/2011 | Lockwood et al. ........... 175/428 |

FOREIGN PATENT DOCUMENTS

| CA | 2276473 | 12/2000 |
| GB | 2005562 | 4/1979 |
| GB | 2073048 | 10/1981 |
| JP | 03159909 | 7/1991 |
| JP | 03159909 A * | 7/1991 |
| WO | WO 2009/061353 | 5/2009 |

* cited by examiner

*Primary Examiner* — Devang R Patel
(74) *Attorney, Agent, or Firm* — Davis & Bujold, PLLC; Michael J. Bujold

(57) ABSTRACT

A method of bonding poly-crystalline diamonds to a wear surface, using commercially available poly-crystalline diamond cutters having poly-crystalline diamond buttons bonded to a carbide core. The poly-crystalline diamond cutters are cooled with cryogenic liquid. The poly-crystalline diamond cutters are crushed to form poly-crystalline diamond cutter fragments, with each of the fragments having a poly-crystalline diamond button fragment still bonded to a carbide core fragment. The carbide core fragment is then bonded onto the wear surface, such that the wear surface includes poly-crystalline diamond buttons fragments.

6 Claims, 3 Drawing Sheets

METHOD OF BONDING POLY-CRYSTALLINE DIAMONDS TO WEAR SURFACES

FIELD

The present method relates to hard coating surfaces that may be used for cutting and wear applications, and such as are provided by composite rods.

BACKGROUND

In highly abrasive applications, such as earth drilling, it is desirable to hard coat exposed areas, or wear surfaces, with wear resistant material, such as carbide. Poly-crystalline diamonds are known to have a wear resistance that is superior to carbide alone. However, bonding poly-crystalline diamonds to wear surfaces is extremely difficult and can only be accomplished under closely controlled conditions.

SUMMARY

There is provided a method of bonding poly-crystalline diamonds to a wear surface. A first step involves acquiring commercially available poly-crystalline diamond cutters having poly-crystalline diamond buttons bonded to a carbide core. A second step involves cooling the poly-crystalline diamond cutters with cryogenic liquid. A third step involves crushing the poly-crystalline diamond cutters to form poly-crystalline diamond cutter fragments. Each of the fragments has a poly-crystalline diamond button fragment still bonded to a carbide core fragment. A fourth step involves bonding the carbide core fragment onto a wear surface, such that the wear surface includes poly-crystalline diamond buttons fragments.

In accordance with the teaching of the above method, the bonding of the poly-crystalline diamond onto the wear surface is made possible by the creation of poly-crystalline diamond cutter fragments that have poly-crystalline diamond button fragments still bonded to carbide core fragments. While the poly-crystalline diamond button fragments will not bond with carbide, the carbide core fragments will. This permits a carbide wear surface to be made that includes poly-crystalline diamond button fragments.

Wear surfaces can be roughly bonded and then shaped using grinders. It was soon discovered that shaping with grinders was no longer practical with poly-crystalline diamond button fragments embedded in the carbide wear surface. The poly-crystalline diamond button fragments are so wear resistant, that the grinder wheels are destroyed by the diamonds. The grinders heat the diamonds to a red hot state, but do not appreciably wear the diamonds down. It is, therefore, preferred that if a more precise and attractive part is required, the carbide core fragment portions of the poly-crystalline diamond cutter fragments be bonded onto a wear surface through a molding process in which the poly-crystalline diamond cutter fragments are inserted into a mold. When formed through a molding process, the need for grinding is reduced, if not eliminated altogether.

When working with the molding process, it was viewed as being desirable to position as many of the poly-crystalline diamond button fragments as possible on the wear surface. It was discovered that some of the poly-crystalline diamond button fragments became embedded so that that they were not strengthening the wear surface as intended. It was determined that more beneficial results were obtained when the carbide core fragment portions of the poly-crystalline diamond cutter fragments were magnetically aligned to selectively position the poly-crystalline diamond button fragments within the mold away from the wear surface.

When cooling and crushing the poly-crystalline diamond cutters, it was determined that although the operation was successful in terms of maintaining poly-crystalline diamond button fragments bonded to carbide core fragments, the size of the resulting poly-crystalline diamond cutter fragments was random. It was determined that more beneficial results could be obtained when larger of the poly-crystalline diamond cutter fragments were cooled and then crushed more than once to reduce all poly-crystalline diamond cutter fragments below a selected size.

There is a multitude of crushing mechanism capable of crushing the poly-crystalline diamond cutters, once the poly-crystalline diamond cutters have been cryogenically treated. However, it was determined that contaminants produced by the crushing equipment during the crushing process tended to interfere with bonding the carbide core fragments to the wear surface. For example, ball mills shed contaminants from the balls during the crushing process. Even more beneficial results were obtained when the poly-crystalline diamond cutters were crushed in a roller mill. The rollers used were soft rollers into which became embedded poly-crystalline diamond cutter fragments, such that the poly-crystalline diamond cutters are crushed by rollers carrying poly-crystalline diamond cutter fragments. Wear against like materials produced no contaminants that would interfere with the bonding process.

It can be relatively difficult to bind poly-crystalline diamond to various materials. In particular, it is difficult to bind it to wear surfaces that need to be hard coated, which may be made from steel, for example. On the other hand, it is known how to bind carbide to wear surfaces. Accordingly, the poly-crystalline diamond buttons are crushed such that a portion of the carbide core remains bound to the poly-crystalline diamond fragment. The fragments may then be bound to the wear surface by binding the carbide core fragment portions to the wear surface using known methods, such as by using silver solder or by brazing.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of bonding poly-crystalline diamonds to wear surfaces will now be described with reference to FIG. 1 through FIG. 3.

Wear surfaces are presently coated with carbide. One form that the carbide comes in is referred to as "composite rod". Composite rod is made from carbide scrap, old aircraft components, worn spray nozzles, etc. As the source of the carbide scrap may vary, the hardness properties of the carbide may also vary. Generally, the composite rod is in a hardness range of 1 to 9 on the Mohs hardness scale, or 19-69 on the Rockwell C-scale. Poly-crystalline diamonds have incredible wear surfaces ten or more times harder than the carbide in composite rod. The initial concept was to add commercially available poly-crystalline diamond buttons to the wear surface to create a much improved wear surface. It was soon discovered that the poly-crystalline diamond buttons would not bond to the carbide of the composite rod. However, it was noted that it was possible to bond poly-crystalline diamond buttons to carbide under closely controlled conditions, as it is presently done with commercially available poly-crystalline diamond cutters. The revised concept, therefore, was to purchase commercially and then crush poly-crystalline diamond cutters, as poly-crystalline diamond cutters already have poly-crystalline diamond buttons bonded to a carbide core. A "button" is generally understood to refer to a larger piece of poly-crystalline diamond, such as a molded form, and may come in various shapes and sizes, depending on the intended use. It was then discovered that crushing the poly-crystalline diamond cutters was difficult and tended to result in the poly-crystalline diamond buttons delaminating from the carbide core. In order to make the crushing easier, heat was applied. It was discovered that, with the application of heat, the problem of the poly-crystalline diamond buttons delaminating was exacerbated. Experiments were conducted in using cryogenic liquid (liquid nitrogen) to cool the poly-crystalline diamond cutters. It was determined that cooling made the crushing much easier. When the poly-crystalline diamond cutters where below the glass transition temperature of carbide, they virtually exploded when subject to crushing pressure. More importantly, most, if not all, of the resulting poly-crystalline diamond cutter fragments were still attached to carbide core fragments. This breakthrough enabled the method that will hereafter be further described to be developed and refined.

Figure 1:
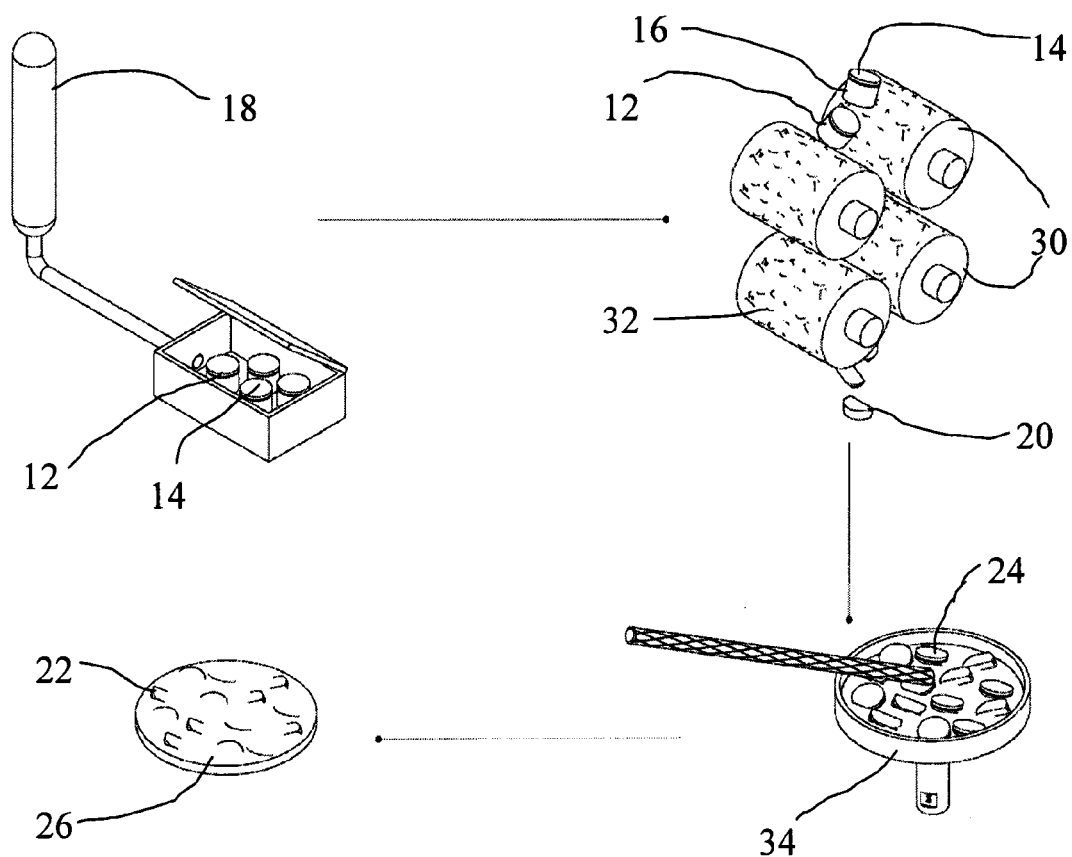
FIG. 1 is a flow diagram setting forth the steps of the method of bonding poly-crystalline diamonds to a wear surface.
Figure 2:
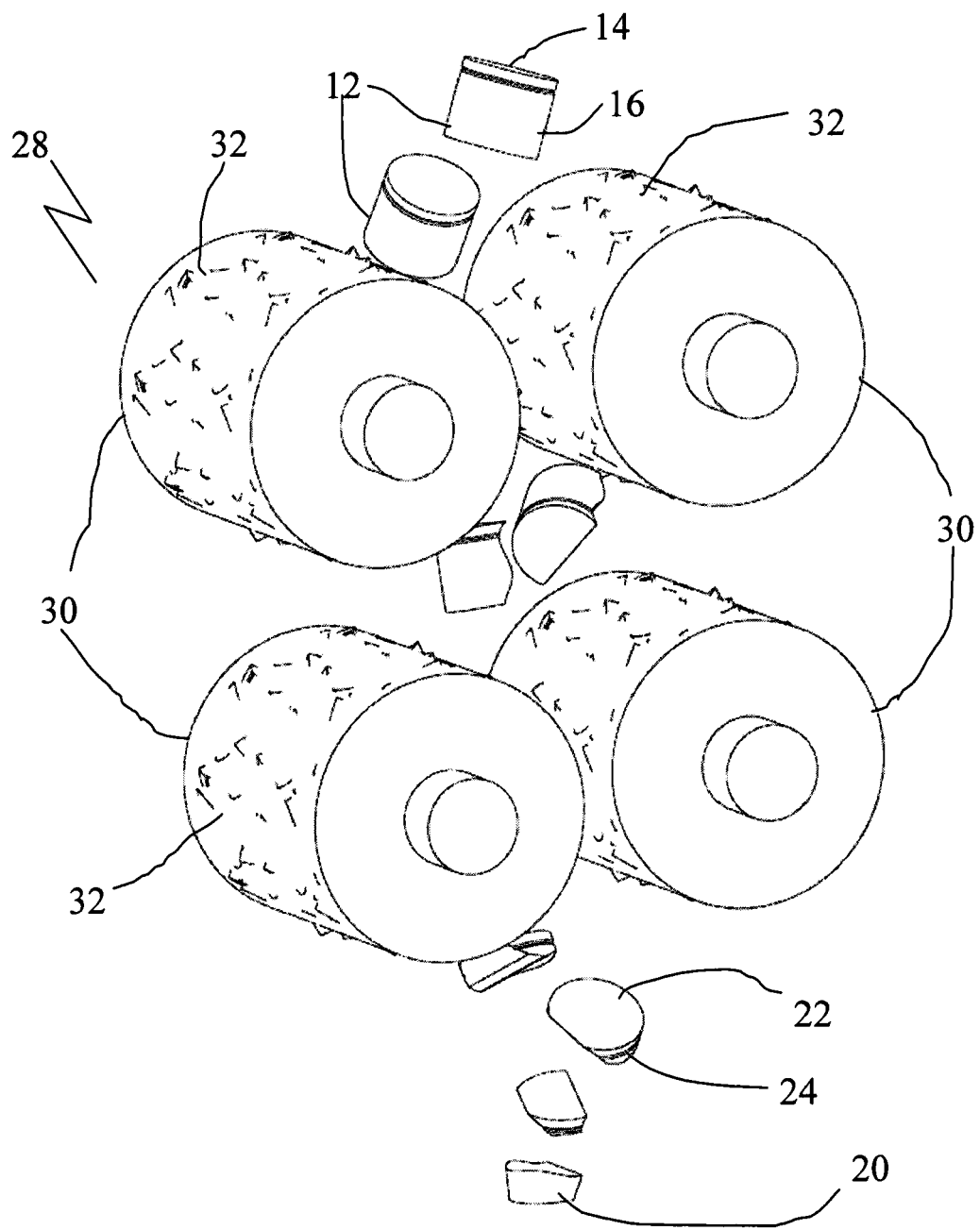
FIG. 2 is a detailed end elevation view of a roller mill shown in FIG. 1.

Referring to FIG. 1, a first step involves acquiring commercially available poly-crystalline diamond cutters 12 having poly-crystalline diamond buttons 14 bonded to a carbide core 16. A second step involves cooling the poly-crystalline diamond cutters 12 in a bath of cryogenic liquid, such as liquid nitrogen 18. It is preferred, but not essential that the cooling take the poly-crystalline diamond cutters 12 below the glass transition temperature of carbide. A third step involves crushing the poly-crystalline diamond cutters 12 to form poly-crystalline diamond cutter fragments 20. Referring to FIG. 2, each of the fragments has a poly-crystalline diamond button fragment 22 still bonded to a carbide core fragment 24, and the bond between fragments 22 and 24 reacts differently to the cooling and crushing steps. Referring to FIG. 1, a fourth step involves bonding the carbide core fragment 24 onto a wear surface 26, such that the carbide wear surface 26 includes poly-crystalline diamond buttons fragments 22. Although the basic steps of the method are outlined above, during the course of working with the method, knowledge was gained as to how to get the best results out of each step in the method as is set forth below.

The Crushing Step

There is a multitude of crushing mechanism capable of crushing the poly-crystalline diamond cutters 12. However, it was determined that contaminants produced by the crushing equipment during the crushing process tended to interfere with bonding the carbide core fragments to the carbide. For example, ball mills shed contaminants from the balls during the crushing process. Even more beneficial results were obtained when the poly-crystalline diamond cutters 12 were crushed in a roller mill, generally indicated by reference numeral 28. Referring to FIG. 2, roller mill 28 has rollers 30 with soft surfaces 32. The reason it is preferred that rollers 30 have soft surfaces 32 is to that poly-crystalline diamond cutter fragments 20 will become embedded in soft surfaces 32 of rollers 30. This results in the poly-crystalline diamond cutters 20 being crushed by rollers carrying poly-crystalline diamond cutter fragments 20. Wear of like materials produced no contaminants that would interfere with the bonding process.

Referring to FIG. 1, when cooling and crushing the poly-crystalline diamond cutters 12, it was determined that although the operation was successful in terms of maintaining poly-crystalline diamond button fragments 22 bonded to carbide core fragments 24, the size of the resulting poly-crystalline diamond cutter fragments 20 was random. It was determined that more beneficial results could be obtained when larger of the poly-crystalline diamond cutter fragments 20 were cooled and then crushed more than once to reduce all poly-crystalline diamond cutter fragments 20 below a selected size.

The Forming Process

Traditional carbide wear surfaces can be roughly formed and then shaped using grinders. It was soon discovered that shaping with grinders was no longer practical with poly-crystalline diamond button fragments 22 embedded on wear surface 26. The poly-crystalline diamond button fragments 22 are so wear resistant, that the grinder wheels are destroyed by the diamonds. The grinders heat the poly-crystalline diamond button fragments 22 to a red hot state, but do not appreciably wear them down. It is, therefore, preferred that if a more precise and attractive part is required, the carbide core fragment portions 24 of the poly-crystalline diamond cutter fragments 20 be bonded onto wear surface 26 through a molding process in which the poly-crystalline diamond cutter fragments 20 are inserted into a mold 34, along with a carbide substrate. When formed through a molding process, the need for grinding is reduced, if not eliminated altogether.

Figure 3:
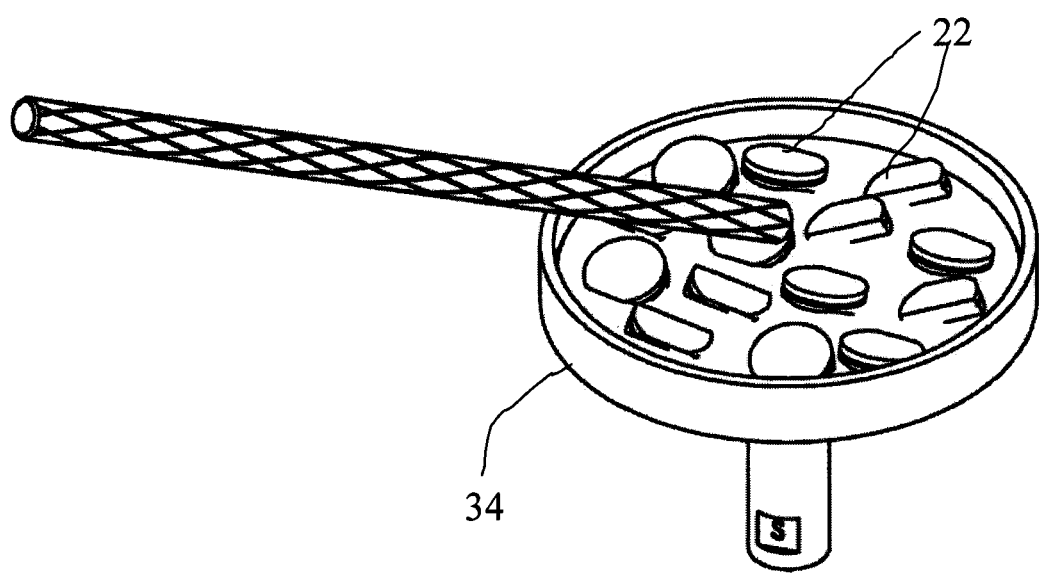
FIG. 3 is a detailed side elevation view of a mold shown in FIG. 1.

Referring to FIG. 3, when working with the molding process, it was viewed as being desirable to position as many of the poly-crystalline diamond button fragments 22 as possible on the wear surface 26. It was discovered that some of the poly-crystalline diamond button fragments 22 became so deeply embedded in the carbide that they were not strengthening the wear surface 26, as intended. It was determined that more beneficial results were obtained when the carbide core fragment portions 24 of the poly-crystalline diamond cutter fragments 20 were magnetically aligned to selectively position the poly-crystalline diamond button fragments 22 within the mold 34 facing outward from the wear surface 26.

It is difficult to bind poly-crystalline diamond to different materials. In particular, it is difficult to bind it to wear surfaces that need to be hard coated, which may be made from steel, for example. On the other hand, it is known how to bind carbide to wear surfaces. Accordingly, the poly-crystalline diamond buttons are crushed such that a portion of the carbide core remains bound to the poly-crystalline diamond fragment. The fragments may then be bound to wear surface 26 by binding the carbide core fragment portions 24 to the wear surface 26 using known methods, such as by using silver solder or by brazing.

It is not possible to illustrate and describe all possible variations for mold 34. The mold 34 which has been illustrated depicts one that is used for composite rod. By way of example only, there may be need of annular bodies having wear surfaces. Those wear surfaces may in either the inner surfaces or the outer surfaces of such annular bodies. By way of example only, there may be a need for wear "plates". It must be reiterated that while the use of mold 34 is preferred, a wear surface may also be prepared without the use of a mold. The only drawback of such an approach is that the part will remain rough as shaping with a grinder is difficult in any surface having poly-crystalline diamond button fragments 22.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of bonding poly-crystalline diamonds to a wear surface, comprising:
    acquiring poly-crystalline diamond cutters having poly-crystalline diamond buttons bonded to a carbide core;
    cooling the poly-crystalline diamond cutters with cryogenic liquid;
    crushing the poly-crystalline diamond cutters to form poly-crystalline diamond cutter fragments, each of the fragments having a poly-crystalline diamond button fragment still bonded to a carbide core fragment; and
    bonding the carbide core fragment onto a wear surface.

2. The method of claim 1, wherein the carbide core fragment portions of the poly-crystalline diamond cutter fragments are bonded onto a wear surface through a molding process in which the poly-crystalline diamond cutter fragments are inserted into a mold with carbide.

3. The method of claim 2, wherein the carbide core fragment portions of the poly-crystalline diamond cutter fragments are magnetically aligned to selectively position the poly-crystalline diamond button fragments within the mold.

4. The method of claim 1, wherein larger of the poly-crystalline diamond cutter fragments are crushed more than once to reduce all poly-crystalline diamond cutter fragments below a selected size.

5. The method of claim 1, wherein the poly-crystalline diamond cutters are crushed in a roller mill, the rollers being soft rollers into which poly-crystalline diamond cutter fragments become embedded, such that the poly-crystalline diamond cutters are crushed by rollers carrying poly-crystalline diamond cutter fragments.

6. The method of claim 1, wherein bonding the carbide core fragment onto a wear surface comprises using silver solder or brazing.

* * * * *